United States Patent
Yanagisawa et al.

(10) Patent No.: US 7,768,291 B2
(45) Date of Patent: Aug. 3, 2010

(54) DISPLAY DEVICE

(75) Inventors: Sho Yanagisawa, Mobara (JP);
Nobuyuki Ishige, Shirako (JP);
Yasuyuki Yamada, Mobara (JP);
Hirokazu Itakura, Ootaki (JP)

(73) Assignee: Hitachi Displays, Ltd., Chiba (JP)

( * ) Notice: Subject to any disclaimer, the term of this patent is extended or adjusted under 35 U.S.C. 154(b) by 684 days.

(21) Appl. No.: 11/812,021

(22) Filed: Jun. 14, 2007

(65) Prior Publication Data
US 2008/0001885 A1    Jan. 3, 2008

(30) Foreign Application Priority Data
Jun. 30, 2006    (JP)    ............................... 2006-181249

(51) Int. Cl.
*G01R 31/00*    (2006.01)
(52) U.S. Cl. .................. 324/770; 349/149; 349/152
(58) Field of Classification Search ........................ None
See application file for complete search history.

(56) References Cited

U.S. PATENT DOCUMENTS 6,750,926 B2    6/2004    Ohgiichi et al.
6,882,397 B2    4/2005    Hayata et al.
7,483,005 B2 *    1/2009    Nakamura et al.    ............. 345/87

FOREIGN PATENT DOCUMENTS

JP    2001-324721    2/2001
JP    2004-101863    9/2002

* cited by examiner

*Primary Examiner*—Minh N Tang
(74) *Attorney, Agent, or Firm*—Stites & Harbison, PLLC; Juan Carlos A. Marquez, Esq.

(57) ABSTRACT

The present invention inspects a defect of a photo sensor element or a photo sensor line. A display device includes a substrate, a plurality of pixels formed on a display region of the substrate, and a plurality of video lines for applying a video voltage to the plurality of pixels. The substrate includes at least one photo sensor element which is formed on a region outside the display region, a photo sensor line which is connected with at least one photo sensor element, and at least one first switching element which connects at least one photo sensor element and at least one video line out of the plurality of video lines. At the time of inspecting the photo sensor element, the first switching element is turned on and, at the same time, a predetermined inspection voltage is applied to at least one photo sensor element via the photo sensor line thus applying a signal to the pixel via the first switching element and the video line, and in response to a turn-on state of the pixel at the time of applying the signal to the pixel, a defect of at least one of at least one photo sensor element and the photo sensor line can be detected.

17 Claims, 6 Drawing Sheets

DISPLAY DEVICE

The present application claims priority from Japanese application JP2006-181249 filed on Jun. 30, 2006, the content of which is hereby incorporated by reference into this application.

BACKGROUND OF THE INVENTION

1. Field of the Invention

The present invention relates to a display device, and more particularly to a technique which is effectively applicable to a method for detecting a defect of a display device which includes photo sensor elements within a display panel.

2. Description of Related Art

A TFT-type liquid crystal display module which uses a thin film transistor as an active element can display images of high definition and hence, the TFT-type liquid crystal display module has been used as a display device such as a display for a television receiver set or a personal computer. Particularly, a miniaturized TFT-type liquid crystal display device has been popularly used as a display part of a mobile phone.

In general, with respect to the liquid crystal display module, in a region surrounded by two neighboring scanning lines (also referred to as gate lines) and two neighboring video lines (also referred to as source lines or drain lines), a thin film transistor which is turned on in response to a scanning signal from the scanning line and a pixel electrode to which a video signal from the video line is supplied via the thin film transistor are formed thus forming a so-called pixel.

A region which forms a plurality of pixels therein constitutes a display region, and a peripheral region exists surrounding the display region. Semiconductor chips which constitute a video drive circuit and a scanning line drive circuit or lines which respectively connect the scanning lines and the video lines in the display region are arranged in the peripheral region.

In this manner, with respect to the liquid crystal display module for the mobile phone, in the peripheral region, the semiconductor chips which constitute the video drive circuit and the scanning line drive circuit or the lines which respectively connect the scanning lines and the video lines in the display region are arranged. Recently, along with the increase of the image display region, the peripheral region is narrowed.

Accordingly, there has been a drawback that it is impossible to ensure a space for forming an inspection terminal for inspecting by turning on the liquid crystal display panel in a peripheral region.

Here, without forming the inspection terminal, it may be possible to use a connection terminal between the scanning line and the semiconductor chip or a connection terminal between the video line and the semiconductor chip as the inspection terminal. In this case, however, there exists a drawback that the alignment between a terminal of an inspection device and the connection terminal becomes difficult.

Accordingly, as a method for detecting a defect of the liquid crystal display panel, a pseudo dynamic lighting inspection (hereinafter referred to as QD lighting inspection) is adopted (see following patent document 1, patent document 2).

According to the QD lighting inspection, the number of inspection terminals can be reduced and hence, even when the peripheral region becomes narrow, it is possible to arrange the inspection terminal for performing the inspection by turning on the liquid crystal display panel.

On the other hand, with respect to the liquid crystal display module for a mobile phone, there has been known a liquid crystal display module which includes a photo sensor element in the inside of a liquid crystal display panel.

This liquid crystal display module which includes a photo sensor element in the inside of a liquid crystal display panel can control brightness of a white light emitting diode which constitutes a backlight in response to an output (in other words, brightness of external light) of the photo sensor element.

In the liquid crystal display module which includes the photo sensor element in the inside of the liquid crystal display panel, as a general technique for inspecting the photo sensor element and first to third photo sensor lines which are connected to the photo sensor element, it may be possible to consider a current monitoring system which determines open short-circuiting by monitoring a difference current value by applying a signal to respective input terminals of the first to third photo sensor lines.

As prior art literatures related to the present invention, followings are named.

Patent document 1: JP-A-2004-101863
Patent document 2: JP-A-2001-324721

SUMMARY OF THE INVENTION

As mentioned above, in the liquid crystal display module which includes the photo sensor element in the inside of the liquid crystal display panel, as the technique for inspecting the photo sensor element and the first to third photo sensor lines, the current monitoring method may be considered. However, this inspection method has a drawback that an inspection facility for monitoring the difference current value becomes necessary.

Further, such an inspection method also has a drawback that respective input terminals of the first to third photo sensor lines have areas smaller than an area of an inspection terminal and hence, it is difficult to align the terminal of the inspection device and the input terminal.

The present invention has been made to overcome the above-mentioned drawbacks of the related art, and it is an advantage of the present invention to provide a technique which, in a display device, can inspect a defect of a photo sensor element and a photo sensor line in response to a turn-on state of a display panel when a predetermined inspection voltage is applied to a photo sensor element via a photo sensor line.

The above-mentioned and other advantages and novel features of the present invention will become apparent from the description of this specification and attached drawings.

To briefly explain the summary of typical inventions among inventions disclosed in this specification, they are as follows.

(1) A display device includes a substrate, a plurality of pixels formed on a display region of the substrate, and a plurality of video lines for applying a video voltage to the plurality of pixels, wherein the substrate includes at least one photo sensor element which is formed on a region outside the display region, a photo sensor line which is connected with at least one photo sensor element, and at least one first switching element which connects at least one photo sensor element and at least one video line out of the plurality of video lines, wherein at the time of inspecting the photo sensor element, the first switching element is turned on and, at the same time, a predetermined inspection voltage is applied to at least one photo sensor element via the photo sensor line thus applying a signal to the pixel via the first switching element and the video line, and in response to a turn-on state of the pixel at the time of applying the signal to the pixel, a defect of at least one of at least one photo sensor element and the photo sensor line can be detected.

(2) In the constitution (1), the substrate may be include at least one thin film transistor which constitutes at least one photo sensor element, a first inspection terminal, a second inspection terminal, a third inspection terminal, a first inspection control terminal, a first photo sensor line which constitutes the photo sensor line and connects a first electrode of at least one thin film transistor and the first inspection terminal, a second photo sensor line which constitutes the photo sensor line and connects a second electrode of at least one thin film transistor and the second inspection terminal, a third photo sensor line which constitutes the photo sensor line and connects a control electrode of at least one thin film transistor and the third inspection terminal, and a first inspection control line which connects a control electrode of at least one first switching element and the first inspection control terminal, wherein the first electrode of the thin film transistor may be connected to at least one video line via the first switching element, and at the time of inspecting the photo sensor element, the first switching element may be turned on by applying a control voltage which turns on the first switching element to the first inspection control terminal and, at the same time, the predetermined inspection voltage is applied to at least one thin film transistor via the first to third photo sensor lines thus applying the signal to the pixel via the first switching element and the video line, and in response to the turn-on state of the pixel at the time of applying the signal to the pixel, a defect of at least one of at least one thin film transistor and the first to third photo sensor lines can be detected.

(3) In the constitution (2), the display device may include a group of terminals which are formed on a peripheral portion of the substrate, and a flexible printed circuit board which is electrically and mechanically connected to predetermined terminals of the group of terminals, wherein the group of terminals may include a first photo sensor terminal which is arranged at a position different from the first inspection terminal, a second photo sensor terminal which is arranged at a position different from the second inspection terminal, and a third photo sensor terminal which is arranged at a position different from the third inspection terminal, wherein the first photo sensor terminal may be connected to the first electrode of at least one thin film transistor via the first photo sensor line, the second photo sensor terminal may be connected to the second electrode of at least one thin film transistor via the second photo sensor line, and the third photo sensor terminal may be connected to the control electrode of at least one thin film transistor via the third photo sensor line.

(4) In the constitution (3), the group of terminals may include a first control terminal, and the substrate may include a first control line which connects the control electrode of at least one first switching element and the first control terminal, and a control voltage which turns off at least one first switching element may be supplied to the first control terminal in a usual use state.

(5) In any one of the constitutions (1) to (4), the substrate may include a plurality of scanning lines which applies a scanning voltage to the plurality of pixels, M pieces of video line inspection terminals, N pieces of scanning line inspection terminals, a plurality of second switching elements which divides the plurality of video lines into M pieces of groups, and connects the video line within each group and one video line inspection terminal out of M pieces of video line inspection terminals to each other, and a plurality of third switching elements which divides the plurality of scanning lines into N pieces of groups, and connects the scanning line within each group and one scanning line inspection terminal out of N pieces of scanning line inspection terminals to each other, wherein a turn-on inspection of the display device may be allowed by turning off the first switching element, turning on the plurality of second switching elements and the plurality of third switching elements and applying a predetermined inspection voltage to the M pieces of video line inspection terminals and the N pieces of scanning line inspection terminals.

(6) In the constitution (5), the plurality of second switching elements and the plurality of third switching elements may be turned off in a usual use state.

(7) In the constitution (5) or (6), a semiconductor chip for driving the display device may be arranged on the plurality of second switching elements and the plurality of third switching elements.

(8) In any one of the constitutions (5) to (7), M may be 3, and three video line inspection terminals may be constituted of the red video line inspection terminal, the green video line inspection terminal and the blue video line inspection terminal.

(9) In any one of the constitutions (5) to (8), N may be 2, and out of the plurality of scanning lines, the neighboring scanning lines may be connected to the scanning line inspection terminals which differ from each other out of the N pieces of scanning line inspection terminals.

(10) In any one of the constitutions (5) to (8), N may be 4, and out of the plurality of scanning lines, the neighboring scanning lines may be connected to the scanning line inspection terminals which differ from each other out of the N pieces of scanning line inspection terminals.

(11) In any one of the constitutions (1) to (10), the first switching element may be turned off in a usual use state.

(12) In any one of the constitutions (1) to (11), the display device may include a static electricity protective circuit which is connected to the photo sensor line.

(13) In any one of the constitutions (1) to (12), the display device may include a fourth switching element which divides at least one photo sensor element into P pieces of groups.

(14) In the constitution (13), the photo sensor elements of each group out of P pieces of groups may be connected with some video lines out of the plurality of video lines.

(15) In the constitution (13) or (14), the fourth switching element may be turned on in a usual use state.

(16) In any one of the constitutions (1) to (15), a light blocking film may not be formed on a portion which is arranged closer to a viewer side than the photo sensor element at a region where at least one photo sensor element is formed.

(17) In any one of the constitutions (1) to (16), a counter substrate may be arranged to face the substrate in an opposed manner and liquid crystal may be sandwiched between the substrate and the counter substrate.

To briefly explain advantageous effects obtained by typical inventions among the inventions disclosed in this specification, they are as follows.

According to the display device of the present invention, it is possible to inspect a defect of the photo sensor element or the photo sensor line in response to a turn-on state of the display panel when the predetermined inspection voltage is applied to the photo sensor element via the photo sensor line.

DESCRIPTION OF THE PREFERRED EMBODIMENTS

Hereinafter, an embodiment of the present invention is explained in detail in conjunction with drawings.

Here, in all drawings for explaining the embodiment, parts having identical functions are given same symbols and their repeated explanation is omitted.

In the embodiment explained hereinafter, the explanation is made with respect to an example which applies the present invention to a liquid crystal display device as one example of a display device.

Figure 1:
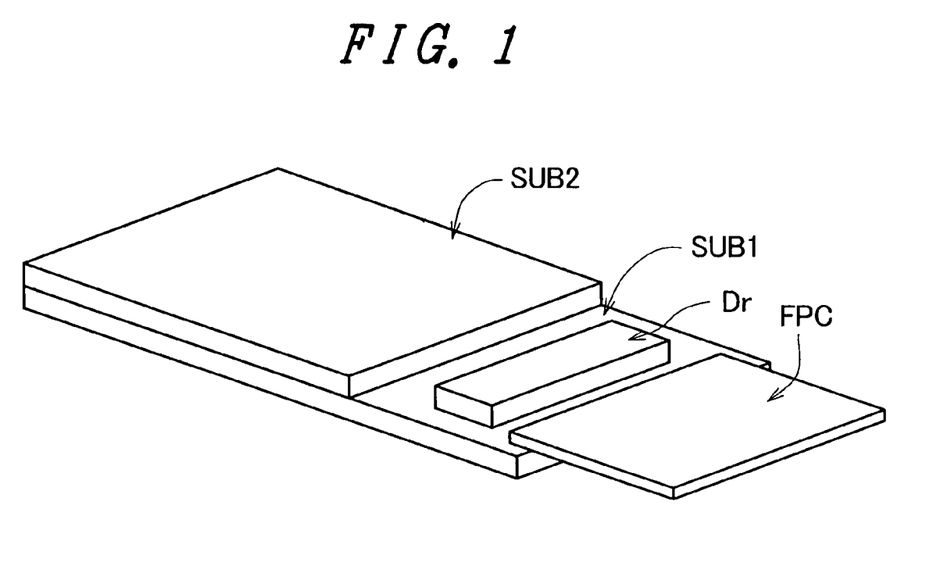
FIG. 1 is a block diagram showing the schematic constitution of a liquid crystal display panel of a liquid crystal display module of an embodiment of the present invention.

FIG. 1 is a block diagram showing the schematic constitution of a liquid crystal display panel of a liquid crystal display module of the embodiment according to the present invention. The liquid crystal display module of this embodiment is a miniaturized TFT-type liquid crystal display module which is used as a display part of the mobile phone.

As shown in FIG. 1. the liquid crystal display panel of this embodiment is configured such that a first substrate (also referred to as a TFT substrate, an active matrix substrate) (SUB1) which forms pixel electrodes, thin film transistors and the like thereon and a second substrate (also referred to as a counter substrate) (SUB2) which forms color filters and the like thereon overlap with each other with a predetermined gap therebetween, and both substrates are adhered to each other by a sealing material which is formed in the form of frame in the vicinity of peripheral portions of both substrates and, at the same time, liquid crystal is filled and sealed inside the sealing material between both substrates from a liquid crystal filling port formed in a portion of the sealing material, and a polarizer is adhered to outer surfaces of both substrates.

In this manner, the liquid crystal display module of this embodiment has the structure which sandwiches the liquid crystal between the pair of substrates.

Further, the first substrate (SUB1) possesses an area larger than an area of the second substrate (SUB2). A semiconductor chip (Dr) which constitutes a driver for driving thin film transistors is mounted on a region of the first substrate (SUB1) which does not face the second substrate (SUB2) in an opposed manner, and a flexible printed circuit board (FPC) is mounted on a peripheral portion on one side of the region. In this embodiment, an example which drives the display device using the semiconductor chip (Dr) is exemplified. However, a drive circuit may be incorporated into the first substrate (SUB1) by integrally forming the drive circuit with the first substrate (SUB1) using a thin film transistor or the like.

Here, it is sufficient that a material of the substrate possesses insulation property and is not limited to the glass and may be plastic or the like. Further, color filters may be formed on a TFT substrate side in place of a counter substrate side. Color filters are unnecessary when the liquid crystal display module is a monochroic liquid crystal display module. In a field sequential liquid crystal display device, color filters are not provided and three light sources may be used in place of a white light emitting diode.

Further, counter electrodes may be mounted on a counter substrate side when the liquid crystal display panel is a TN-type or VA-type liquid crystal display panel. When the liquid crystal display panel is an IPS-type liquid crystal display panel, the counter electrodes are mounted on the TFT substrate side.

Here, in the present invention, when the internal structure of the liquid crystal display panel is not related to the present invention, the detailed explanation of such internal structure of the liquid crystal display panel is omitted. Further, the present invention is applicable to a liquid crystal display panel of any structure.

Figure 2:
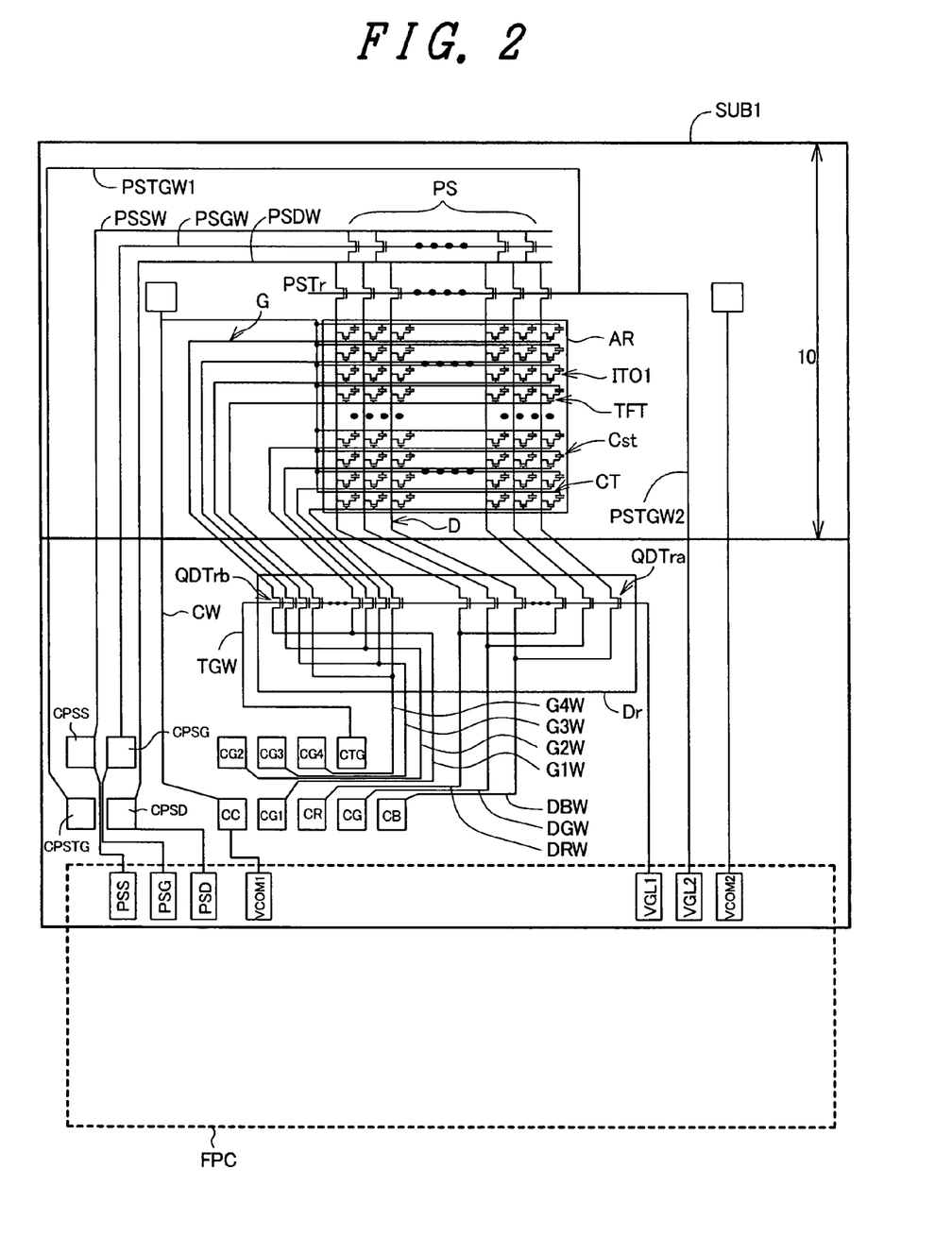
FIG. 2 is a schematic view for explaining a first substrate of the embodiment of the present invention.

FIG. 2 is a schematic view for explaining the first substrate (SUB1) of this embodiment.

In FIG. 2, symbol AR indicates a display region and pixels are formed in a matrix array within a display region AR. In this embodiment, the pixel is constituted of a pixel electrode (ITO1) and a thin film transistor (TFT) which applies a video voltage to the pixel electrode (ITO1), and the pixels are formed in a matrix array.

Gate electrodes of the thin film transistors (TFT) in the row direction are connected to a scanning line (G), while drain electrodes of the thin film transistors (TFT) in the column direction are connected to a video line (D). A source electrode of the thin film transistor (TFT) is connected to the pixel electrode (ITO1).

Further, between the pixel electrode (ITO1) and the counter signal line (CT), a holding capacitance (Cst) is formed.

In this embodiment, a scanning voltage of a High level which turns on the thin film transistor (TFT) is sequentially applied to the scanning line (G). Due to such an operation, the thin film transistors (TFT) on one display line are sequentially turned on, and a video voltage on the video line (D) is applied to the pixel electrode (ITO1) on one display line and hence, image is displayed on the liquid crystal display panel.

The liquid crystal display panel of this embodiment includes a photo sensor element in the inside thereof. That is, in this embodiment, in a peripheral region other than the display region (AR) of the first substrate (SUB1), which is also a region where the first substrate (SUB1) and the second substrate (SUB2) face each other (a region indicated by an arrow 10 in FIG. 2), at least one transistor (PS) which constitutes at least one photo sensor element is arranged. The photo sensor element may be formed of a thin film transistor (TFT). In this embodiment, a plurality of transistors (PS) are arranged.

Source electrodes of the plurality of transistors (PS) are connected to an inspection terminal (CPSS) and an input terminal (PSS) via a first photo sensor line (PSSW). In the same manner, drain electrodes of the plurality of transistors (PS) are connected to an inspection terminal (CPSD) and an input terminal (PSD) via a second photo sensor line (PSDW).

Further, gate electrodes of the plurality of transistors (PS) are connected to an inspection terminal (CPSG) and an input terminal (PSG) via a third photo sensor line (PSGW).

The drain electrodes of the plurality of transistors (PS) are connected to video lines (D) of the liquid crystal display panel via transistors (PSTr) which constitute first switching elements. The transistor (PSTr) may be formed of a thin film transistor.

The gate electrodes of the transistors (PSTr) are connected to an inspection terminal (CPSTG) via a line (PSTGW1) and, at the same time, are connected to an input terminal (VGL2) via a line (PSTGW2). Here, the respective lines shown in FIG. 2 are lines which are formed on the first substrate (SUB1).

Further, in a region of the first substrate (SUB1) which does not face the second substrate (SUB2), inspection terminals (CR, CG, CB) and video line inspection lines (DRW, DGW, DBW) which are connected to the inspection terminals (CR, CG, CB) are arranged.

Here, the red video line is connected to the red video line inspection line (DRW) via a transistor (QDTra) which constitutes a second switching element, the green video line is connected to the green video line inspection line (DGW) via a transistor (QDTra), and the blue video line is connected to the blue video line inspection line (DBW) via a transistor (QDTra). In this embodiment, first, fourth, seventh . . . video lines (D) are connected to the inspection terminal (CR) as a group, second, fifth, eighth . . . video lines (D) are connected to the inspection terminal (CG) as a group, and the third, sixth, nines . . . video lines (D) are connected to the inspection terminal (CB) as a group.

Further, in the region of the first substrate (SUB1) which does not face the second substrate (SUB2), inspection terminals (CG1, CG2, CG3, CG4) and scanning line inspection lines (G1W, G2W, G3W, G4W) which are connected to the inspection terminals (CG1, CG2, CG3, CG4) are arranged.

Further, the odd-numbered scanning lines are connected to the scanning line inspection line (either one of G1W, G3W) via a transistor (QDTrb) which constitutes a third switching element, and the even-numbered scanning lines are connected to scanning line inspection line (either one of G2W, G4W) via a transistor (QDTrb) which constitutes the third switching element. Further, a counter signal line (CT) is connected to an input terminal (VCOM1) via a common line (CW). In this embodiment, first, fifth, ninth . . . scanning lines (G) are connected to the inspection terminal (CG1) as a group, second, sixth, tenth . . . scanning lines (G) are connected to the inspection terminal (CG2) as a group, and the third, seventh, eleventh . . . scanning lines (G) are connected to the inspection terminal (CG3) as a group, and the fourth, eighth, twelfth . . . scanning lines (G) are connected to the inspection terminal (CG4) as a group. Here, instead of forming the scanning lines (G) into four groups as in the case of this embodiment, the scanning lines may be formed into two groups consisting of the odd-numbered lines and the even-numbered lines.

Further, in performing a pull-around operation of the scanning lines (G), when the scanning lines (G) are pulled around both sides (left side and right side) instead of pulling the scanning lines (G) only one side (left side) as shown in FIG. 2, scanning lines (G) are divided into four groups (or two groups) of scanning lines (G) which are pulled around the left side and four groups (or two groups) of scanning lines (G) which are pulled around the right side thus forming eight groups (or four groups) of the scanning lines (G) in total, and eight (or four) inspection terminals of the scanning lines (G) may be formed corresponding to such groups of scanning lines (G).

The gate electrode of the transistor (QDTra) which constitutes the second switching element and the gate electrode of the transistor (QDTrb) which constitutes the third switching element are connected to the inspection terminal (CTG) and the input terminal (VGL1) via the line (TGW). The transistor (QDTra) and the transistor (QDTrb) may be formed of a thin film transistor.

In this embodiment, although an example in which the lines and the terminal for turning on the second switching element and the line and the terminal for turning on the third switching element are used in common is exemplified, these lines and terminals may be separately formed.

Here, in FIG. 2, a common voltage (Vcom) which is applied to the counter electrodes is supplied to the input terminal (VCOM1) and an input terminal (VCOM2).

Further, in FIG. 2, symbol FPC depicted by a dotted frame indicates a flexible printed circuit board which is mounted on one side of the first substrate (SUB1), and input terminals (PSS, PSG, PSD, VCOM1, VCOM2, VGL1, VGL2) are electrically and mechanically connected to predetermined terminals on the flexible printed circuit board (FPC).

Next, a method for inspecting the photo sensor elements (transistors (PS)) and the first to third photo sensor lines (PSSW, PSDW, PSGW) shown in FIG. 2 is explained.

(1) First of all, for example, voltages which respectively exhibit 0V ($V_{CR}=V_{CG}=V_{CB}=0V$) are applied to the inspection terminals (CR, CG, CB). For example, voltages which respectively exhibit 13V ($V_{CG1}=V_{CG2}=V_{CG3}=V_{CG4}=13V$) are applied to the inspection terminals (CG1, CG2, CG3, CG4). For example, a voltage of 3.3V ($V_{CC}=3.3V$) is applied to the inspection terminal (CC). For example, a voltage of 26V ($V_{CTG}=26V$) is applied to the inspection terminal (CTG). That is, as an initial state for the inspection, the transistors (QDTra, QDTrb) are turned on and, at the same time, the transistors (TFT) of the respective pixels are turned on. Further, by applying 0V as the video signal, the pixel is set to a turn-off state. Here, the explanation is made with respect to an example which uses the liquid crystal display panel of a normally white mode.

(2) Next, for example, a voltage of 0V ($V_{CPSS}=0V$) is applied to the inspection terminal (CPSS). For example, a voltage of −5V (voltage at which the transistor (PS) is turned off) ($V_{CPSG}=-5V$) is applied to the inspection terminal (CPSG). For example, a voltage of 3.3V ($V_{CPSD}=3.3V$) is applied to the inspection terminal (CPSD). For example, a voltage of 26V ($V_{CPSTG}=26V$) is applied to the inspection terminal (CPSTG). Due to such an operation, the transistor (PSTr) which constitutes the first switching element is turned on. When the second photo sensor line (PSDW) is not disconnected, the voltage of 3.3V is supplied to the pixel via the transistor (PSTr) and the video line (D) and hence, the pixel is turned on. To the contrary, when the display region (AR) is not turned on, the disconnection of the second photo sensor line (PSDW) can be detected.

(3) Next, for example, a voltage of 0V ($V_{CPSS}=0V$) is applied to the inspection terminal (CPSS). For example, a voltage of 3.3V (voltage at which the transistor (PS) is turned on) ($V_{CPSG}=3.3V$) is applied to the inspection terminal (CPSG). For example, a voltage of 0V ($V_{CPSD}=0V$) is applied to the inspection terminal (CPSD). For example, a voltage of 26V ($V_{CPSTG}=26V$) is applied to the inspection terminal (CPSTG). Due to such an operation, a voltage of 3.3V flows into the video line (D). That is, when the display region (AR) is turned on, short-circuiting between the third photo sensor line (PSGW) and the second photo sensor line (PSDW) can be detected.

(4) Next, for example, a voltage of 3.3V ($V_{CPSS}=3.3V$) is applied to the inspection terminal (CPSS). For example, a voltage of −5V ($V_{CPSG}=-5V$) is applied to the inspection terminal (CPSG). For example, a voltage of 0V ($V_{CPSD}=0V$) is applied to the inspection terminal (CPSD). For example, a voltage of 26V ($V_{CPSTG}$=26V) is applied to the inspection terminal (CPSTG). Due to such an operation, a voltage of 3.3V flows into the video line (D). That is, when the display region (AR) is turned on, the short-circuiting between the first photo sensor line (PSSW) and the third photo sensor line (PSGW) or the short-circuiting between the first photo sensor line (PSSW) and the second photo sensor line (PSDW) can be detected. For example, this operation is also applicable to a case in which a defect that the transistor (PS) cannot be turned off occurs.

(5) Next, for example, a voltage of 3.3V ($V_{CPSS}$=3.3V) is applied to the inspection terminal (CPSS). For example, a voltage of 3.3V ($V_{CPSG}$=3.3V) is applied to the inspection terminal (CPSG). For example, a voltage of 0V ($V_{CPSD}$=0V) is applied to the inspection terminal (CPSD). For example, a voltage of 26V ($V_{CPSTG}$=26V) is applied to the inspection terminal (CPSTG). Due to such an operation, when display region (AR) is not turned on, the disconnection of the first photo sensor line (PSSW) or the third photo sensor line (PSGW) can be detected. Further, this operation is also applicable to a case in which a defect that the transistor (PS) cannot be turned off occurs.

Due to the above-mentioned operations, a defect of at least one of the photo sensor element and the photo sensor line can be detected.

Here, the inspection may be performed by reversing the turn-on state and the turn-off state of the pixel. Further, a liquid crystal display panel of a normally black mode may be used. In any case, it is possible to cope with the short-circuiting and the disconnection by suitably changing voltages applied to the respective inspection terminals.

Further, to ensure an operation of the photo sensor element, in the above-mentioned state (4), it may be possible to ensure whether the pixel is turned on when light is irradiated.

Upon completion of the inspection, when the liquid crystal display panel is driven in a usual use state, for example, a voltage of −5V is applied to the input terminal (VGL2). Due to such an operation, a voltage of −5V is applied to the gate electrode of the transistor (PSTr) via the line (PSTGW2) and hence, the transistor (PSTr) can be turned off whereby an image can be displayed in a stable manner. Here, in this embodiment, although the voltage which turns off the transistor (PSTr) is applied via a terminal (VGL2) which is connected with the flexible printed circuit board (FPC), the voltage may be supplied from an output terminal of the semiconductor chip (Dr).

Figure 4:
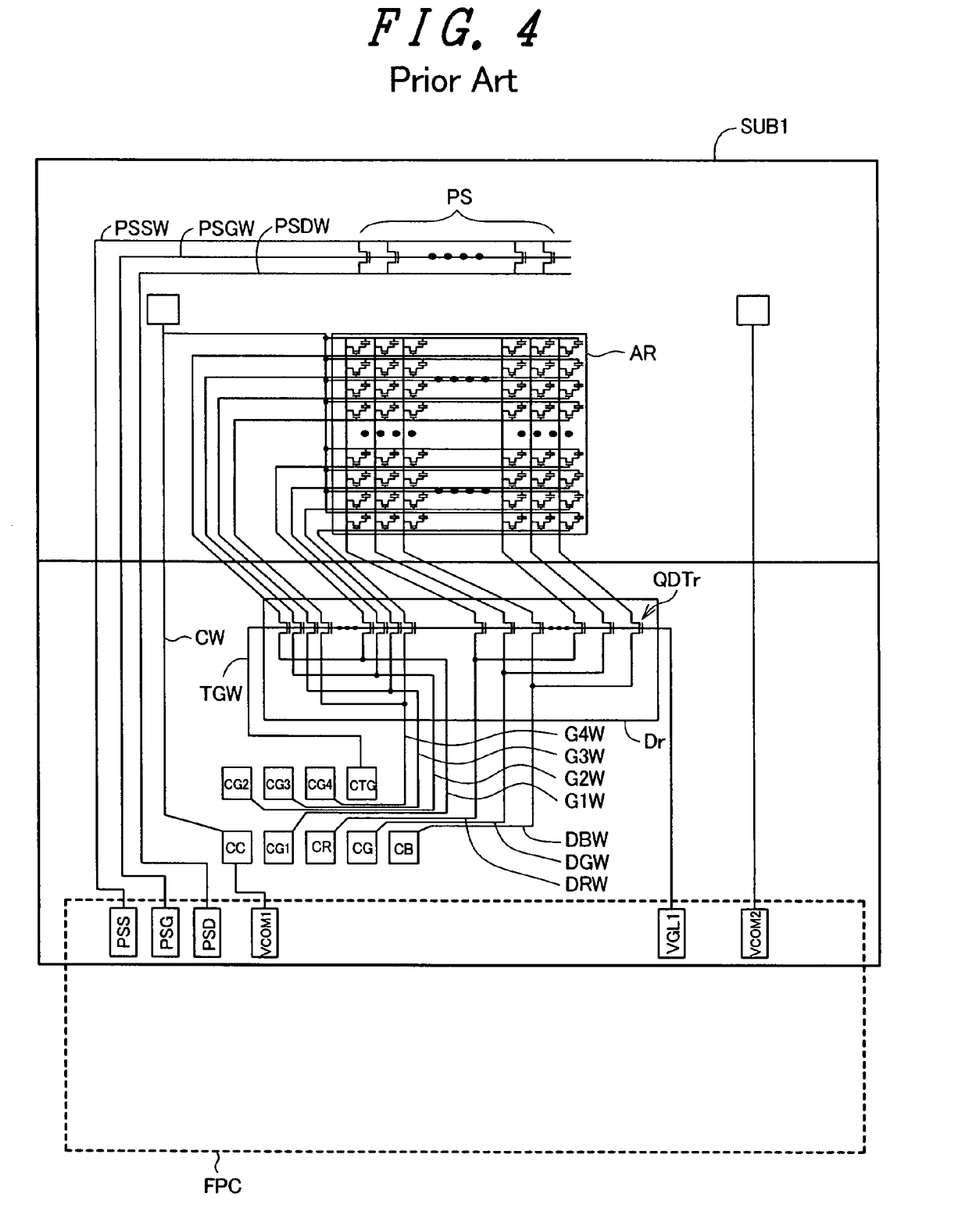
FIG. 4 is a schematic view for explaining a first substrate in a conventional liquid crystal display module which includes a photo sensor element in the inside of a liquid crystal display panel.

FIG. 4 is a schematic view for explaining the first substrate (SUB1) in the conventional liquid crystal display module which includes the photo sensor element in the inside of the liquid crystal display panel.

In the conventional constitution shown in FIG. 4, the transistor (PSTr) which constitutes the first switching element is not provided. Accordingly, the drain electrodes of the plurality of transistors (PS) which constitute the photo sensor elements are not connected with the video lines (D) of the liquid crystal display panel. Further, the inspection terminals (CPSS, CPSG, CPSD, CPSTG) are not provided.

In the liquid crystal display module shown in FIG. 4, by applying signals to the respective input terminals (PSS, PSG, PSD) of the first to third photo sensor lines and by monitoring a difference current value, open short-circuiting of the transistor (PS) and the first to third photo sensor lines (PSSW, PSDW, PSGW) is determined by a so-called current monitoring method.

However, as mentioned previously, the inspection method based on the current monitoring system has the drawback that the inspection facility which monitors the difference current value becomes necessary. Further, the respective input terminals (PSS, PSG, PSD) of the first to third photo sensor lines exhibit small areas compared to the areas of the inspection terminals (CPSS, CPSG, CPSD) thus giving rise to a drawback that the alignment between the terminals of an inspection device and the input terminals becomes difficult.

However, according to this embodiment, it is possible to monitor the open short-circuiting of the plurality of transistors (PS) which constitute the photo sensor elements and the first to third photo sensor lines (PSSW, PSDW, PSGW) based on the turn-on state or the turn-off state of the display region (AR) in place of the difference current value.

Due to such an operation, it is unnecessary to newly introduce a device which monitors the difference current value and can inspect the open short-circuiting using a currently available inspection device.

Further, when the liquid crystal display panel is driven after completion of the inspection, by applying a voltage of, for example, −5V to the input terminal (VGL2), it is possible to turn off the transistor (PSTr) and hence, it is possible to display an image in a stable manner.

As mentioned previously, the photo sensor element (transistor (PS)) is arranged in the peripheral region other than the display region (AR) of the first substrate (SUB1) which is also a region where the first substrate (SUB1) faces the second substrate (SUB2).

Figure 3:
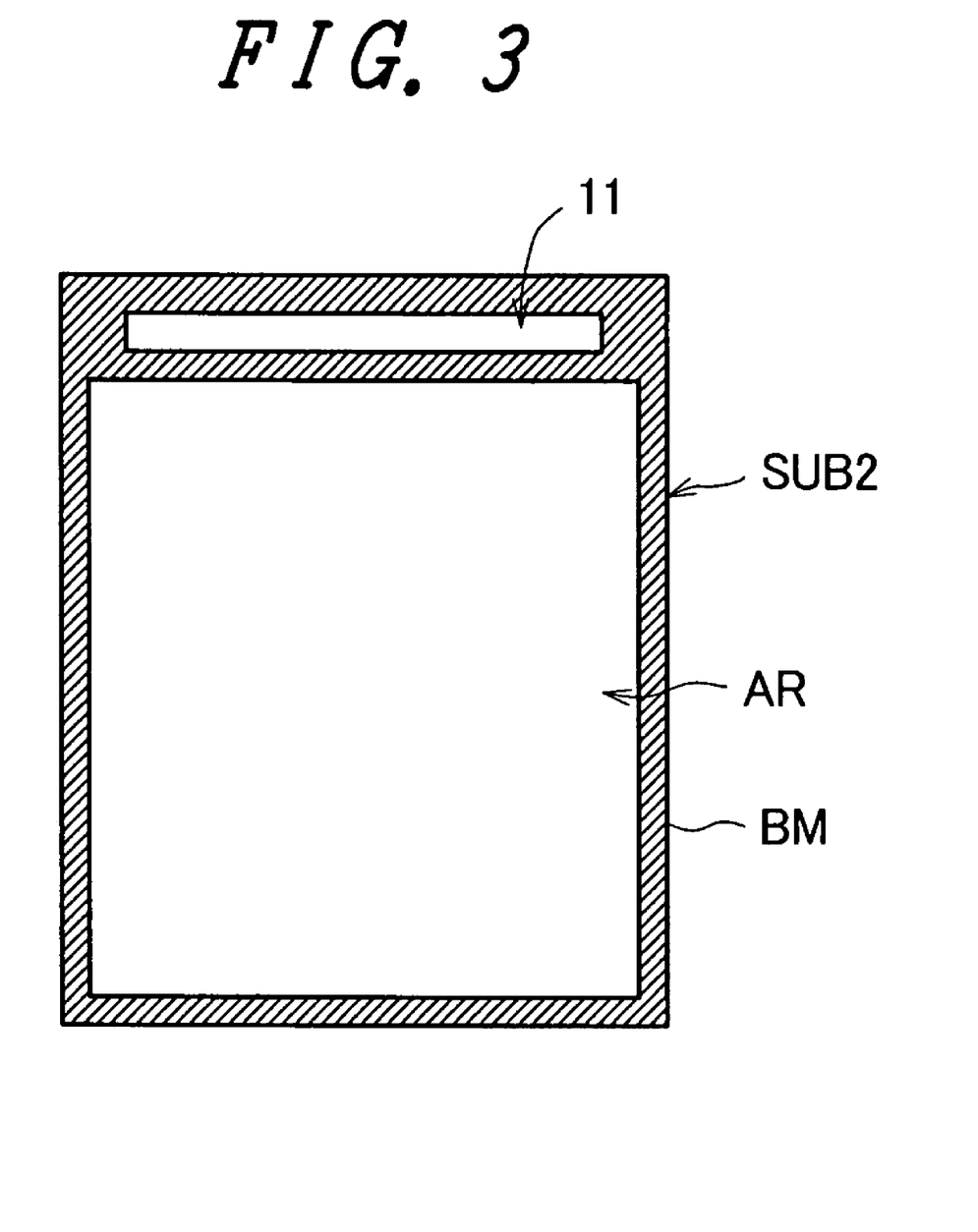
FIG. 3 is a view for explaining an opening portion formed on a side of a second substrate of the embodiment of the present invention.

In general, on the peripheral region of the second substrate (SUB2) other than the display region (AR), a light blocking film (BM) is formed for blocking light.

Accordingly, when the light blocking film (BM) is formed on the peripheral region of the second substrate (SUB2) other than the display region (AR), as shown in FIG. 3, it is necessary to form opening portions 11 in portions of the light blocking film (BM) formed on the peripheral region other than the display region (AR) which face the plurality of transistors (PS) constituting the photo sensor elements.

The QD turn-on inspection of this embodiment is explained hereinafter. In the explanation made hereinafter, a case which uses the liquid crystal display panel of a normally white mode is explained.

In FIG. 2, first of all, for example, a voltage of −5V ($V_{CPSTG}$=−5V) is applied to the inspection terminal (CPSTG) so as to turn off the transistor (PSTr). Further, for example, a voltage of 26V ($V_{CTG}$=26V) is applied to the inspection terminal (CTG) so as to turn on the transistors (QDTra, QDTrb). Further, for example, a voltage of 3.3V ($V_{CC}$=3.3V) is applied to the inspection terminal (CC).

(1) A predetermined voltage is applied to the inspection terminals (CR, CG, CB) and a pulse voltage is applied to the inspection terminals (CG1, CG3) for inspecting odd-numbered scanning lines. On the other hand, a pulse voltage with a delayed cycle with respect to the pulse voltage applied to the inspection terminals (CG1, CG3) is applied to the inspection terminals (CG2, CG4) for inspecting even-numbered scanning lines. Due to such a constitution, it is possible to detect the short-circuiting between the scanning lines by observing a display state of the liquid crystal display panel.

(2) Next, by setting the voltage supplied to the inspection terminal (CR) for inspecting the red video line to a voltage (for example, 3.6V) substantially equal to the counter voltage and by setting the voltage supplied to the inspection terminals (CG, CB) for inspecting the green and blue video lines to a voltage (for example, 7V) which exhibits a large difference with respect to the counter voltage, it is possible to perform a red display on the liquid crystal display panel. Here, by checking whether the red is displayed normally or not, it is possible to inspect the disconnection of the red video line and the short-circuiting between the red video line and the video line adjacent to the red video line.

In the same manner, by displaying either one of green or blue, it is possible to inspect the disconnection of the green or blue video line and the short-circuiting between the green or blue video line and the video line adjacent to the green or blue video line.

It is desirable that the QD turn-on inspection of the pixel is performed prior to the inspection of the photo sensor element of the present invention.

Upon completion of the inspection, for example, a voltage of −5V is applied to the input terminal (VGL1). Due to such an operation, in a usual use state, the voltage of −5V is applied to the gate electrodes of the transistors (QDTra, QDTrb) via lines (TGW) and hence, it is possible to turn off the transistors (QDTra, QDTrb) whereby an image can be displayed in a stable manner.

Here, in FIG. 2, a region (Dr) indicated by a solid line is a region on which a semiconductor chip for driving liquid crystal is mounted and, after completion of the inspection, one ends of the respective video lines and the scanning lines are connected to predetermined electrodes of the semiconductor chip (Dr). It is desirable that the transistors (QDTra, QDTrb) are covered and concealed with the semiconductor chip (Dr).

Further, in this embodiment, the voltage which turns off the transistors (QDTra, QDTrb) is applied via the terminal (VGL1) which is connected with the flexible printed circuit board (FPC). However, the voltage may be supplied from an output terminal of the semiconductor chip (Dr).

Figure 5:
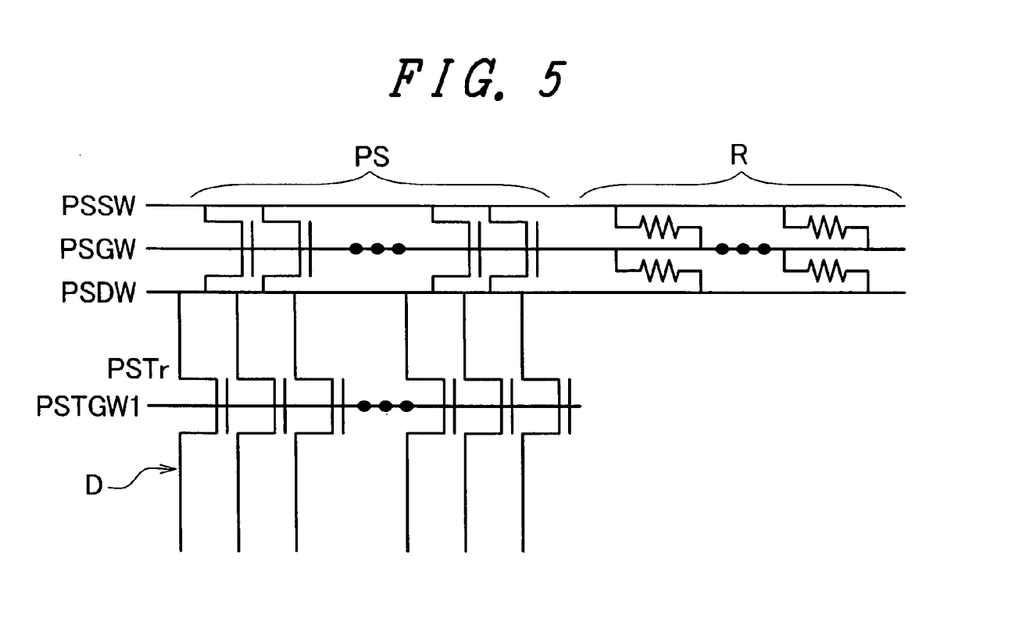
FIG. 5 is a schematic view for explaining a modification of the embodiment of the present invention.

FIG. 5 is a schematic view for explaining a modification of the embodiment of the present invention.

In this modification, a static electricity protective circuit is connected to photo sensor lines. In FIG. 5, an example which connects at least one resistance (R) to the photo sensor lines as an example of the static electricity protective circuit is shown.

Figure 6:
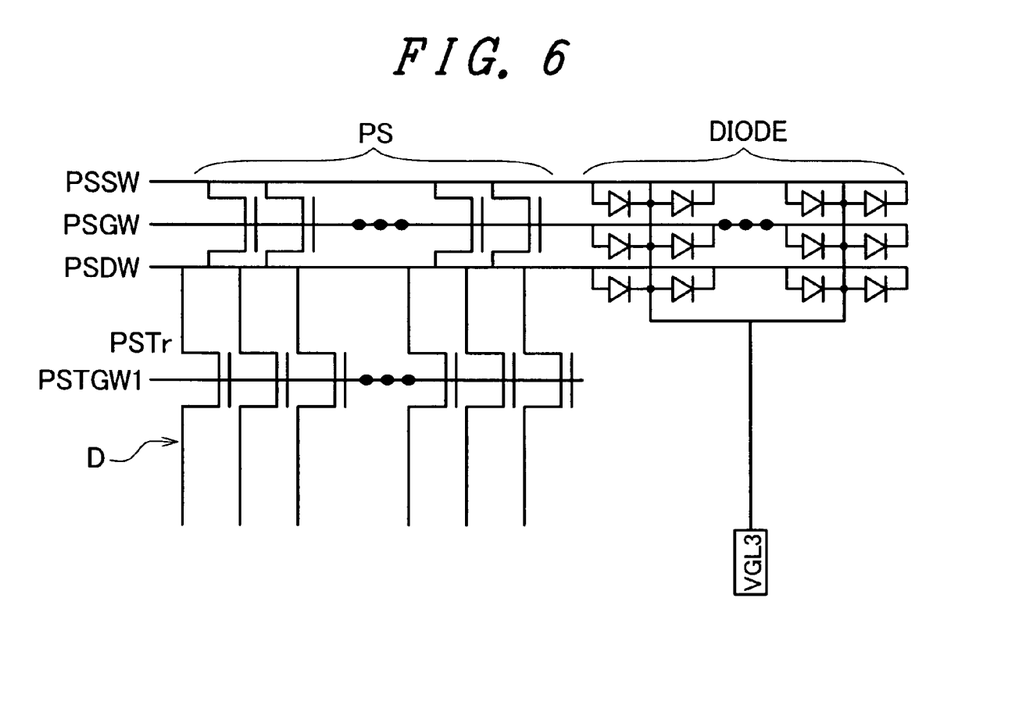
FIG. 6 is a schematic view for explaining a modification of the embodiment of the present invention.

FIG. 6 is a schematic view for explaining a modification of the embodiment of the present invention.

Also in this modification, a static electricity protective circuit is connected to photo sensor lines. In FIG. 6, as one example of the static electricity protective circuit, an example which connects at least one diode (DIODE) is exemplified. An input terminal (VGL3) is connected to a node of a two-way diode (DIODE) and, for example, a voltage of −5V is applied to the input terminal (VGL3).

In this embodiment, a predetermined voltage is applied to the node of the tow-way diode (DIODE) via the terminal (VGL3) which is connected with a flexible printed circuit board (FPC). However, the voltage may be supplied from an output terminal of a semiconductor chip (Dr).

Figure 7:
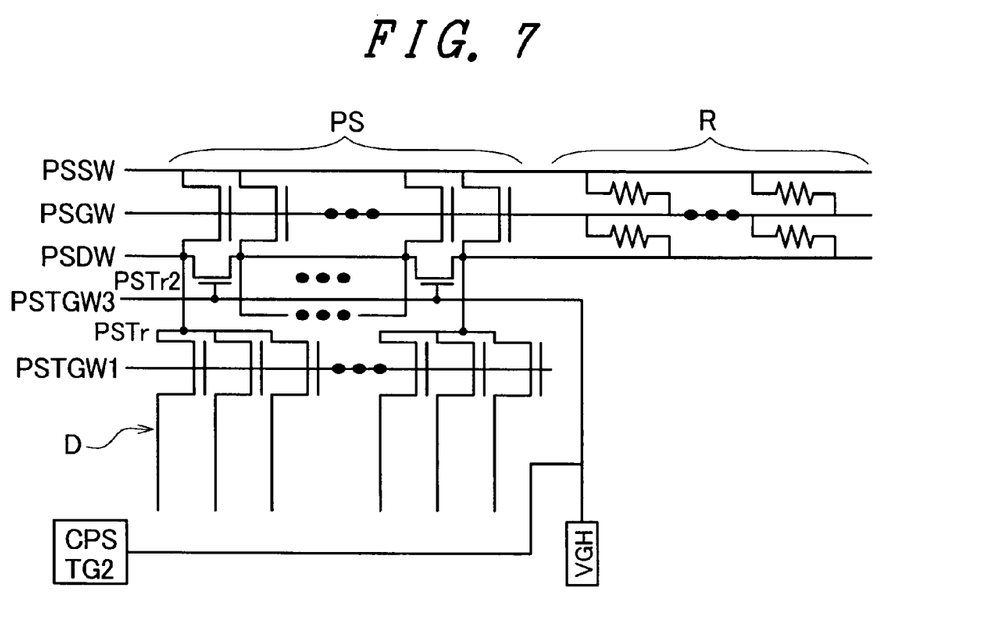
FIG. 7 is a schematic view for explaining a modification of the embodiment of the present invention.

FIG. 7 is a schematic view for explaining a modification of the embodiment of the present invention.

In this embodiment, photo sensor elements (transistors (PS)) are divided by fourth switching elements (for example, transistors (PSTr2) formed of a thin film transistor).

In the embodiment explained in conjunction with FIG. 2, the photo sensor line (PSDW) is always connected to the drain electrodes of the transistors (PS) in common and hence, even when a defect that some transistors (PS) are not turned on in the inspection step (5), for example, provided that some other transistors (PS) are normally turned on, there exists a possibility that the transistors (PS) are determined as normal.

Accordingly, as shown in FIG. 7, by arranging the transistors (PSTr2) in the course of the photo sensor lines (PSDW), the transistors (PS) are divided into a plurality (P pieces) of groups. To gate electrodes of the transistors (PSTr2), an inspection terminal (CPSTG2), a line (PSTGW3) and input terminal (VGH) are connected.

Video lines (D) are also divided into P pieces of groups. Each group includes at least one video line (D). Here, an example in which each group is constituted of three video lines (D) is exemplified. Each group of the transistors (PS) which are divided into P pieces of groups corresponds to one group out of the video lines (D) which are divided in P pieces of groups on one to one face, and each group of the transistors (PS) is connected with the group of the video lines (D) via a transistor (PSTr).

Due to such a constitution, when it is necessary to inspect the drain electrodes of the transistors (PS) in division, for example, a voltage of −5V may be applied to the inspection terminal (CPSTG2) and the transistor (PSTr2) may be turned off. When it is necessary to inspect the drain electrodes of the transistor (PS) in a state that the drain electrodes are connected with each other, for example, a voltage of 15V may be applied to the inspection terminal (CPSTG2) and the transistor (PSTr2) may be turned on.

Further, in a usual use state, for example, a voltage of 15V may be applied to the input terminal (VGH) so as to turn on the transistors (PSTr2). In this embodiment, the voltage which turns on the transistors (PSTr2) is applied via the terminal (VGH) which is connected with a flexible printed circuit board (FPC). However, the voltage may be configured to be supplied from an output terminal of a semiconductor chip (Dr). With respect to the number of video lines (D) in one group, one video line (D) may be used. However, in view of the easiness of determination of a turn-on state or a turn-off state of a pixel, it is more desirable to use two or more video lines (D) in one group as shown in FIG. 7.

Further, the static electricity protective circuit explained in conjunction with FIG. 5 which uses the resistance (R) may be connected to the photo sensor lines.

Figure 8:
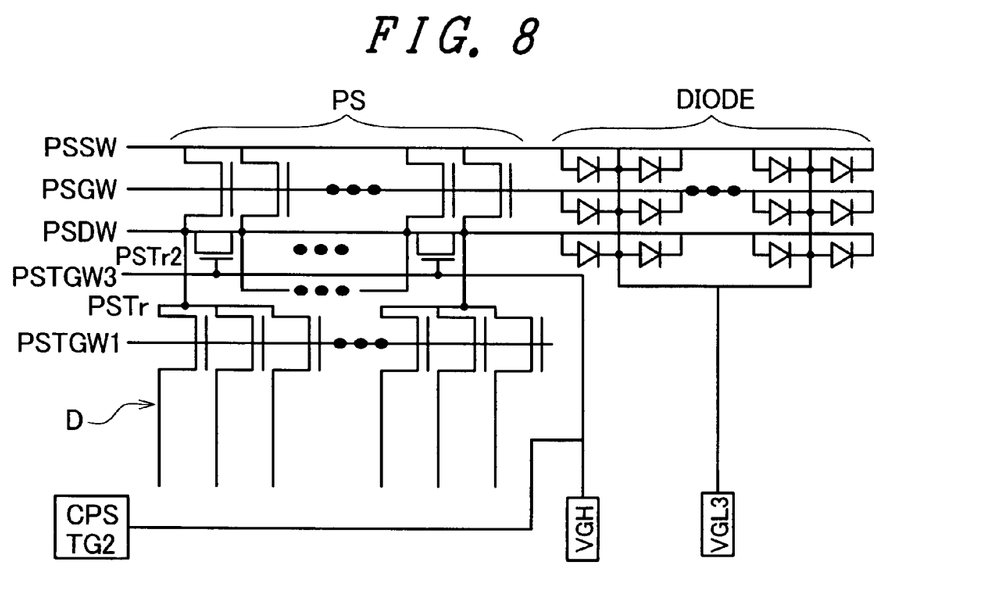
FIG. 8 is a schematic view for explaining a modification of the embodiment of the present invention.

FIG. 8 is a schematic view for explaining a modification of the embodiment of the present invention.

In the embodiment shown in FIG. 8, the static electricity protective circuit shown in FIG. 7 is constituted of the diode (DIODE) explained in conjunction with FIG. 6.

The present invention is not limited to the liquid crystal display device and is applicable to the display devices having pixels in general such as an organic EL display device, for example.

Further, the static electricity protective circuit may adopt the constitution other than the constitution explained in this specification. Further, the provision of the static electricity protective circuit in the constitution shown in FIG. 7 or FIG. 8, for example, may be arbitrarily determined.

Although the invention made by inventors of the present invention has been specifically explained in conjunction with the embodiment heretofore, it is needless to say that the present invention is not limited to the above-mentioned embodiment and various modifications are conceivable without departing from the gist of the present invention.

What is claimed is:

1. A display device comprising:
   a substrate;
   a plurality of pixels formed on a display region of the substrate; and
   a plurality of video lines for applying a video voltage to the plurality of pixels, wherein
   the substrate includes:
   at least one photo sensor element which is formed on a region outside the display region;
   a photo sensor line which is connected with at least one photo sensor element; and at least one first switching element which connects at least one photo sensor element and at least one video line out of the plurality of video lines, wherein at the time of inspecting the photo sensor element, the first switching element is turned on and, at the same time, a predetermined inspection voltage is applied to at least one photo sensor element via the photo sensor line thus applying a signal to the pixel via the first switching element and the video line, and in response to a turn-on state of the pixel at the time of applying the signal to the pixel, a defect of at least one of at least one photo sensor element and the photo sensor line is detectable.

2. A display device according to claim 1, wherein the substrate includes:

at least one thin film transistor which constitutes at least one photo sensor element;

a first inspection terminal;

a second inspection terminal;

a third inspection terminal;

a first inspection control terminal;

a first photo sensor line which constitutes the photo sensor line and connects a first electrode of at least one thin film transistor and the first inspection terminal;

a second photo sensor line which constitutes the photo sensor line and connects a second electrode of at least one thin film transistor and the second inspection terminal;

a third photo sensor line which constitutes the photo sensor line and connects a control electrode of at least one thin film transistor and the third inspection terminal; and a first inspection control line which connects a control electrode of at least one first switching element and the first inspection control terminal, wherein the first electrode of the thin film transistor is connected to at least one video line via the first switching element, and at the time of inspecting the photo sensor element, the first switching element is turned on by applying a control voltage which turns on the first switching element to the first inspection control terminal and, at the same time, the predetermined inspection voltage is applied to at least one thin film transistor via the first to third photo sensor lines thus applying the signal to the pixel via the first switching element and the video line, and in response to the turn-on state of the pixel at the time of applying the signal to the pixel, a defect of at least one of at least one thin film transistor and the first to third photo sensor lines is detectable.

3. A display device according to claim 2, wherein the display device comprises:

a group of terminals which are formed on a peripheral portion of the substrate; and a flexible printed circuit board which is electrically and mechanically connected to predetermined terminals of the group of terminals, wherein the group of terminals includes:

a first photo sensor terminal which is arranged at a position different from the first inspection terminal;

a second photo sensor terminal which is arranged at a position different from the second inspection terminal; and a third photo sensor terminal which is arranged at a position different from the third inspection terminal, wherein the first photo sensor terminal is connected to the first electrode of at least one thin film transistor via the first photo sensor line, the second photo sensor terminal is connected to the second electrode of at least one thin film transistor via the second photo sensor line, and the third photo sensor terminal is connected to the control electrode of at least one thin film transistor via the third photo sensor line.

4. A display device according to claim 3, wherein the group of terminals includes a first control terminal, the substrate includes a first control line which connects the control electrode of at least one switching element and the first control terminal, and a control voltage which turns off at least one first switching element is supplied to the first control terminal in a usual use state.

5. A display device according to claim 1, wherein the substrate includes:

a plurality of scanning lines which applies a scanning voltage to the plurality of pixels;

M pieces of video line inspection terminals;

N pieces of scanning line inspection terminals;

a plurality of second switching elements which divides the plurality of video lines into M pieces of groups, and connects the video line within each group and one video line inspection terminal out of M pieces of video line inspection terminals to each other; and a plurality of third switching elements which divides the plurality of scanning lines into N pieces of groups, and connects the scanning line within each group and one scanning line inspection terminal out of N pieces of scanning line inspection terminals to each other, wherein a turn-on inspection of the display device is allowed by turning off the first switching element, turning on the plurality of second switching elements and the plurality of third switching elements and applying a predetermined inspection voltage to the M pieces of video line inspection terminals and the N pieces of scanning line inspection terminals.

6. A display device according to claim 5, wherein the plurality of second switching elements and the plurality of third switching elements are turned off in a usual use state.

7. A display device according to claim 5, wherein a semiconductor chip for driving the display device is arranged on the plurality of second switching elements and the plurality of third switching elements.

8. A display device according to claim 5, wherein M is 3, and three video line inspection terminals are constituted of the red video line inspection terminal, the green video line inspection terminal and the blue video line inspection terminal.

9. A display device according to claim 5, wherein N is 2, and out of the plurality of scanning lines, the neighboring scanning lines are connected to the scanning line inspection terminals which differ from each other out of the N pieces of scanning line inspection terminals.

10. A display device according to claim 5, wherein N is 4, and out of the plurality of scanning lines, the neighboring scanning lines are connected to the scanning line inspection terminals which differ from each other out of the N pieces of scanning line inspection terminals.

11. A display device according to claim 1, wherein the first switching element is turned off in a usual use state.

12. A display device according to claim 1, wherein the display device includes a static electricity protective circuit which is connected to the photo sensor line.

13. A display device according to claim 1, wherein the display device includes a fourth switching element which divides at least one photo sensor element into P pieces of groups.

14. A display device according to claim 13, wherein the photo sensor elements of each group out of P pieces of groups are connected with some video lines out of a plurality of video lines.

15. A display device according to claim 13, wherein the fourth switching element is turned on in a usual use state.

16. A display device according to claim 1, wherein a light blocking film is not formed on a portion which is arranged closer to a viewer side than the photo sensor element at a region where at least one photo sensor element is formed.

17. A display device according to claim 1, wherein a counter substrate is arranged to face the substrate in an opposed manner and liquid crystal is sandwiched between the substrate and the counter substrate.

* * * * *